United States Patent [19]

Dakin et al.

[11] Patent Number: 5,306,987
[45] Date of Patent: Apr. 26, 1994

[54] ACOUSTIC RESONANCE ARC STABILIZATION ARRANGEMENT IN A DISCHARGE LAMP

[75] Inventors: James T. Dakin; Mark E. Duffy, both of Shaker Heights, Ohio

[73] Assignee: General Electric Company, Schenectady, N.Y.

[21] Appl. No.: 29,501

[22] Filed: Mar. 11, 1993

[51] Int. Cl.$^5$ ............................................. H05B 41/29
[52] U.S. Cl. ..................... 315/248; 315/39; 315/283; 315/344; 313/517
[58] Field of Search ............... 315/248, 34, 39, 283, 315/344; 313/517

[56] References Cited

U.S. PATENT DOCUMENTS

| | | | |
|---|---|---|---|
| 4,894,591 | 1/1990 | Witting | 315/248 |
| 4,959,592 | 9/1990 | Anderson et al. | 315/248 |
| 5,059,868 | 10/1991 | El-Hamamsu et al. | 315/248 |
| 5,095,249 | 3/1992 | Roberts et al. | 315/248 |
| 5,107,185 | 4/1992 | El-Hamamsy et al. | 315/248 |
| 5,140,227 | 8/1992 | Dakin et al. | 315/248 |
| 5,151,633 | 9/1992 | Farrall et al. | 315/248 |
| 5,187,412 | 2/1993 | El-Hamamsy et al. | 315/248 |
| 5,243,261 | 9/1993 | Bergervoet et al. | 315/248 |
| 5,248,918 | 9/1993 | Dakin et al. | 315/344 |

Primary Examiner—John T. Kwon
Attorney, Agent, or Firm—George E. Hawranko; Stanley C. Corwin

[57] ABSTRACT

An arc stabilization arrangement for a discharge lamp having a light transmissive arc tube containing a fill of gas excitable to a discharge state upon introduction thereto of a drive signal having a predetermined frequency associated therewith, includes a modulating arrangement effective for providing a modulating signal which is imposed onto the drive signal. The modulating signal has a frequency associated therewith which approximates the acoustic resonance of the gases within the fill, such modulating signal frequency being less than the frequency of the drive signal. In one embodiment of the invention the modulating arrangement is an amplitude modulating scheme effective such that a modulating amplitude of greater than about 5% of the amplitude of the drive signal is achieved. In yet a further implementation of the present invention, the frequency of the modulating signal is swept about a range of frequencies so that a varying acoustic resonance frequency can be encompassed by the modulating signal.

13 Claims, 4 Drawing Sheets

ACOUSTIC RESONANCE ARC STABILIZATION ARRANGEMENT IN A DISCHARGE LAMP

FIELD OF THE INVENTION

This invention relates to an arrangement for stabilizing the discharge arc within an arc discharge lamp by use of a modulation scheme using frequencies in the acoustic resonant band. More particularly, this invention relates to such an acoustic resonance arc stabilizing arrangement that is applicable to any type of discharge lamp which utilizes radio frequency energy to excite the discharge arc and which is susceptible to arc instability under certain conditions.

BACKGROUND OF THE INVENTION

In a discharge lamp wherein the arc discharge is initiated and/or maintained by means of a time varying drive signal such as a radio frequency (RF) current signal, there is a risk that under certain conditions, such arc discharge could become unstable and wander around the arc tube rather than remaining in a stable position as desired. This arc wandering or instability can cause the light output to flicker as well as to eventually extinguish altogether thus resulting in the need to restrike the lamp. This condition can occur in several different types of discharge lamps, including high intensity discharge (HID) and microwave excited sulfur lamps regardless of whether the lamp is electrodeless or electroded or, if in an electrodeless lamp, whether the drive signal is inductively or capacitively coupled to the fill within the arc tube. An example of one lamp which is susceptible to arc instability under certain conditions is an inductively-coupled, electrodeless HID lamp typically comprising an arc tube of quartz or other high-temperature light transmissive material in which an electrodeless toroidal arc discharge is developed. U.S. Pat. No. 4,810,938 issued to Johnson et al and assigned to the same assignee as the present invention illustrates the electrodeless HID lamp which utilizes an excitation coil disposed in surrounding relation to a portion of the arc tube and which is energized by an RF signal to develop a solenoidal field within the arc tube; the solenoidal field is effective for generating the above-described toroidal arc discharge. Thereafter, the excitation coil acts as a primary winding of a transformer, and the toroidal arc discharge, inductively coupled to the primary winding, acts as the secondary winding of this transformer. Other examples of further developments relating to this type of discharge lamp can be found in U.S. Pat. Nos. 4,812,702 issued to Anderson, 5,047,692 issued to Borowiec et al, 5,140,227 issued to Dakin et al and 5,150,015 issued to Heindl et al, all of which are assigned to the same assignee as the present invention and all of which are herein incorporated by reference. Another example of a lamp which may be susceptible to arc instability and which could be improved in performance by use of the present invention can be found in U.S. Pat. No. 4,975,625 issued to Lynch et al for an Electrodeless Lamp energized by microwave excitation.

We have found that when the excitation coil or other type of drive mechanism for exciting an arc discharge within an arc tube, is energized by RF current having a frequency greater than about 1 kilohertz, with one exemplary frequency being about 13.56 MHz, the discharge within the arc tube sometimes exhibits the undesirable instability previously discussed wherein the discharge can become constricted, wander in shape and position, and is prone to self-extinction. This is in marked contrast to the steady, fluffy appearance of the discharge under ideal stable conditions, during which time the discharge expands to occupy a substantial portion of the space within the arc tube and remain in close proximity to the arc tube wall. For the example of the electrodeless high intensity discharge lamp of U.S. Pat. No. 4,810,938 previously discussed, the stable toroidal discharge arc expands in a radial direction to fill the arc tube. In a lamp using a gas fill which includes a metal halide and an inert gas, it has been observed that when the arc tube is operated at a power level above some threshold value, such instability occurs as a result of the arc tube containing halogen in excess of metal halide stoichiometry. The excess halogen, often excess iodine, usually results from the loss of active metal from the arc tube dose. Operation of the other types of discharge lamps previously discussed at a power level in excess of some threshold value is also expected to result in the occurrence of the previously described unstable operation.

Therefore, it would be advantageous if an arc stabilization arrangement for arc discharge lamps could be provided that would allow for the operation of such lamps at power levels above those previously achieved without the risk of such arc discharge becoming unstable. It would also be advantageous if our invention could provide such improvement in arc stability without adversely impacting on the luminous efficacy of the lamp over the broad power range beneath the threshold level.

Another concern with the operation of an arc discharge lamp at an optimum power level and in a practical application such as in a fixture whereby the lamp can be oriented in any number of different manners such that the arc tube is inverted or has its axis tilted at any angle between vertical and horizontal, is that the arc stabilization arrangement remain equally effective as if the lamp were oriented in an upright manner. It would be advantageous if the arc stabilizing arrangement of the present invention could be equally effective with the arc tube oriented in a non-upright manner as it were for an upright orientation.

In carrying out the efforts which resulted in the present invention, it was discovered that the operation of the drive signal in conjunction with a frequency in the acoustic resonance band could provide the desired arc stability. Up until recently, the operation of a lamp at any frequency in the acoustic resonance band was considered to be very undesirable, that such operation itself was inherently unstable. Recent developments however have indicated that there are conditions under which acoustic resonance operation may in fact be beneficial. In U.S. Pat. Nos. 4,983,889 and 5,121,034 issued to Roberts and Allen et al respectively, both of which are assigned to the same assignee as the present invention, acoustic resonance operation is described for use with electroded metal halide lamps. Though effective for arc stabilization to the extent of arc straightening and the thorough mix of the gas fill constituents, such patents teach that the lamp should be driven at the acoustic resonance frequency and do not provide guidance for operation at higher frequencies as are utilized for electrodeless lamps. U.S. patent application Ser. No. 07/897,601 filed in the name of Dakin et al on Jun. 10, 1992 and also assigned to the same assignee as the present invention also discusses acoustic resonance operation of a metal halide lamp. This application of acoustic resonance operation of a metal halide lamp is effective for substantially reducing color separation in the principal arc discharge region, however, this application also teaches that the lamp should be operated using this acoustic resonance frequency to achieve the stated advantage. Recognizing that such acoustic resonance frequency typically occurs on the kilohertz range which is suitable for operating an electroded discharge lamp, electrodeless discharge lamps on the other hand are typically operated at frequencies approaching or exceeding the megahertz region and therefore could not benefit from these teachings. Accordingly, it would be advantageous to provide an acoustic resonance arc stabilization arrangement which would be equally effective for operation with electroded as well as electrodeless discharge lamps using the same stabilization techniques and which would be operable over a significantly wide range of operating frequencies used to drive the discharge.

SUMMARY OF THE INVENTION

The present invention provides an acoustic resonance arc stabilization arrangement for a discharge lamp which is equally effective for discharge lamps operated by means of a drive signal at extremely low frequency RF regions as well as at the opposite or extremely high frequency RF regions. Additionally, the present invention allows for such further benefits as: allowing operation of the discharge lamp at an optimum power level not previously attainable without risk of the lamp becoming unstable, and, allowing the arc tube to be oriented at upright as well as non-upright angles without risking lamp destabilization.

In accordance with the principles of the present invention, there is provided an arc stabilization arrangement for stabilizing an arc discharge lamp having an arc tube containing a fill energizable to a discharge state by introduction of an RF signal at a predetermined frequency thereto. The arc stabilization arrangement includes a circuit arrangement for modulating the RF signal with a modulating signal that has a frequency less than the predetermined frequency of the RF signal used to excite the discharge arc within the arc tube. In the preferred embodiment of the invention, the modulating signal frequency approximates the then prevailing acoustic resonance frequency of the fill in the arc tube.

In one embodiment of the present invention, the modulating signal imposed on the RF signal which drives the discharge arc, is an amplitude modulating signal configured as a sine wave and which is effective for providing a modulation amplitude of greater than about 5% of the amplitude of the RF drive signal. It has been found that this modulation technique utilizing the acoustic resonance frequency for the modulating signal exerts a stabilizing effect on the discharge within the arc tube so as to maintain the arc discharge within adjacent proximity to the arc tube wall thereby inhibiting the discharge from wandering about and self-extinguishing even at power levels above the threshold at which the discharge would typically become unstable without the modulation technique of utilizing the acoustic resonance frequency.

It has been further observed that in a situation where the acoustic resonance frequency of the fill tended to change due to changes in temperature of the gases contained in the fill for instance, the arc stabilization could not be maintained for an indefinite period of time as would be desirable. It was discovered that by sweeping the frequency of the modulating signal over a range of frequencies which would encompass the variations in acoustic resonance frequency, arc stabilization could be maintained as desired. Therefore, in another embodiment of the invention, a means is provided for varying the frequency of the modulating signal over a range of frequencies that would encompass the variations in acoustic resonance frequency of the fill, thereby ensuring that arc stabilization is maintained even under conditions in which the acoustic resonance frequency of the fill varies.

BRIEF DESCRIPTION OF THE DRAWINGS

For a better understanding of the invention, reference may be made to the following detailed description taken in connection with the accompanying drawings in which.

DETAILED DESCRIPTION OF THE INVENTION

In the following detailed description, reference will be made to the phenomena of acoustic resonance which has a frequency or range of frequencies associated therewith and which occurs within the arc tube of a discharge lamp in conjunction with the excitation of the gases contained within the arc tube. The acoustic resonance condition is one wherein periodic oscillations in pressure occur in phase with the amplitude-modulating component of the input power thereby producing standing pressure waves. Reference will also be made to the term vertical-sloshing acoustic resonance which refers to the condition of acoustic resonance where the discharge gas within the arc tube moves from one position in the arc tube to another; that is, the discharge gas wanders during each cycle of the modulating signal. This vertical-sloshing acoustic resonance is also sometimes refered to in the literature as the ns=11 mode as described in the paper by J. W. Denneman in Philips Journal of Research, Vol. 38, pages 263-272, Nos. 4/5, 1983.

Figure 1:
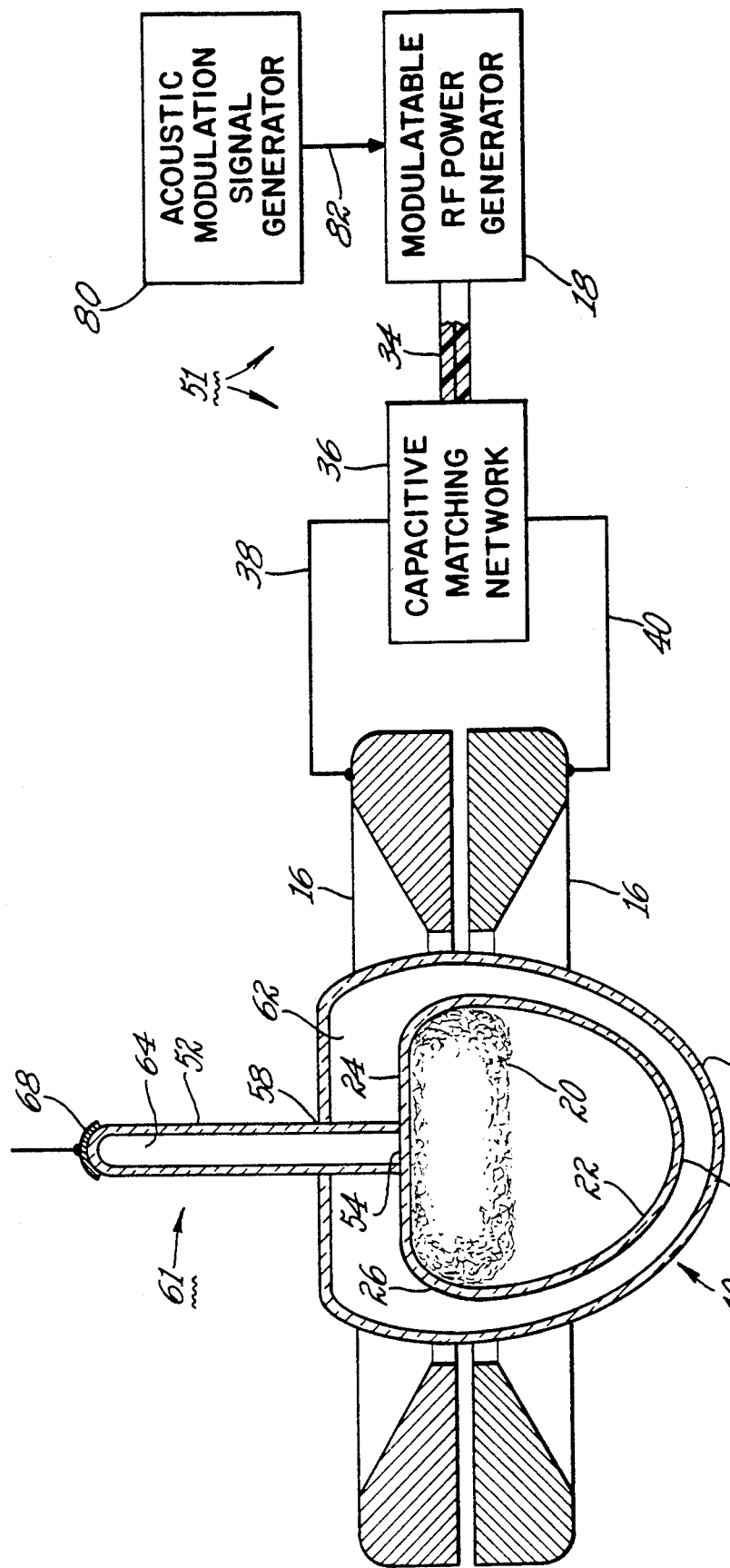
FIG. 1 is a schematic drawing of a lighting system embodying one form of invention as applied to an inductively-coupled electrodeless HID lamp and energizing system therefor.

Referring now to FIG. 1, a discharge lamp 10, which in this illustration is an electrodeless HID lamp, includes an arc tube 14 having its walls formed of a high temperature, light transmissive material such as fused quartz or polycrystalline alumina. An excitation coil 16 surrounds arc tube 14 and has connected thereto, a radio frequency (RF) power generator 18 for exciting arc discharge 20 within the arc tube 14. A power generator suitable for use as the component 18 is one available from ENI Power Systems, Inc., of Rochester, N.Y., as its Model HF-1 RF Power Generator. By way of example and not intended as a limitation to the scope of the present invention, the arc discharge 20 is shown as a toroidal discharge disposed at the topmost portion of the arc tube 14 which is shaped generally so as to have a substantially flattened upper surface 24. Arc tube 14 also includes a generally hemispherically shaped body portion 22 which is connected to the flattened upper surface 24 by way of an annular junction region 26 shaped in a rounded cross-sectional configuration. It should be appreciated that the shape of arc tube 14 can be modified in various manners and yet continue to enjoy the benefits of the present invention relating to the stabilization of the discharge arc within the arc tube; such various arc tube shapes as well as the different discharge arc shapes associated with the various arc tube shapes are contemplated as being within the scope of the present invention. For instance, in an electroded metal halide discharge lamp utilizing a cylindrically shaped double ended quartz arc tube wherein the discharge arc is energized by an RF signal and is substantially linear in shape, the arc stabilization arrangement of the present invention could be equally effective as will be described with reference to the discharge lamp 10 shown in FIG. 1.

The arc tube 14 is dosed with a fill in which the above-noted toroidal discharge arc 20 is excited during lamp operation. A suitable fill for this application is one consisting essentially of sodium iodide and cerium iodide, in equal weight proportions, in combination with xenon at a partial pressure of about 500 torr. U.S. Pat. No. 4,972,120 issued to H. L. Witting on Nov. 20, 1990 assigned to the same assignee as the present invention and herein incorporated by reference, discloses another fill for an electrodeless HID lamp which would include a combination of lanthanum halide, a sodium halide, a cerium halide and xenon or krypton as a buffer gas. Of course, it should be understood that in other discharge lamps that would use the arc stabilization arrangement of the present invention, the fill may be different; for instance, as previously stated with respect to cited reference U.S. Pat. No. 4,975,625, the fill for an electrodeless lamp energized by microwave excitation includes sulfur. These as well as other fills for discharge lamps, are comprehended by our invention.

In the form of the invention shown in FIG. 1, the excitation coil 16 is formed as a two turn coil configured in a manner such as described in commonly assigned U.S. Pat. No. 5,039,903 issued to G. A. Farrall on Aug. 13, 1991 and which is incorporated by reference herein. It is to be understood that the invention in its broader aspects contemplates the use of other suitable coil designs in place of that illustrated and further contemplates that the excitation device could also be one which capacitively coupled the RF energy to the fill.

In the illustrated embodiment, the RF power generator 18 for driving or energizing the coil 16 can operate at a radio frequency greater than 1 kHz and in the present example, will operate at a frequency of 13.56 MHz. The power generator 18 is coupled to the coil 16 through the series combination of a coaxial cable 34, and a capacitive matching network 36 of suitable form. In a specific embodiment, network 36 comprises two variable capacitors (not shown) adjusted so that the matching network provides 50 ohms of input impedance at the cable and further, so that the matching network 36, with coil 16, resonates at 13.56 MHz. A suitable matching network 36 of this general type is disclosed and claimed in the above-cited Borowiec et al patent U.S. Pat. No. 5,047,692. Two conductive leads 38, 40 connect the matching network 36 to opposite terminals of the coil 16. The energizing system 51 for lamp 10 includes the excitation coil 16, the electric components 34–40 previously discussed and, shown in block diagram form, the acoustic modulation signal generator 80 which is coupled to the RF power generator 18 via channel 82 and which will be discussed hereinafter in further detail relative to the operation of the arc stabilization arrangement of the present invention.

In the embodiment of the lamp 10 illustrated in FIG. 1, the arc tube 14 is enclosed within an outer envelope 50, preferably of quartz, that serves to reduce heat loss from the arc tube 14 and to protect the arc tube wall from harmful surface contamination. The arc tube 14 is supported within the outer envelope 50 by means of a hollow stem 52 of elongated tubular configuration joined through fusion to the outer surface of the arc tube wall in a region 54 of the arc tube 14. In a location 58, spaced along the stem from region 54, the stem extends through an opening in the top wall of the outer envelope 50 and is fused about its outer periphery to the top wall to form a vacuum-tight seal. In one embodiment, the space 62 between the outer envelope 50 and the arc tube 14 is evacuated so as to provide thermal insulation for reducing heat loss from the arc tube 14.

In the FIG. 1 embodiment, the stem 52 serves as a portion of a starting aid 61 that is used for initiating operation of the lamp 10 where desired. A lamp including such a starting aid is disclosed and claimed in the above-cited U.S. Pat. No. 5,140,227 issued to Dakin et al and to which reference may be had for a detailed description of the operation of such starting aid. Of course, it should be understood that not all discharge lamps that could utilize the arc stabilization arrangement of the present invention would require the use this type of a starting aid or any starting aid for that matter and as such, the discussion of a starting aid is not intended to limit the scope of the present invention.

As described in greater detail in the aforesaid Dakin et al ('227) patent, stem 52 is sealed off and filled with a suitable gas that can be readily broken down by application of a moderately high voltage. The breakdown within stem 52 causes a discharge to occur therein which is effective for triggering a dielectric breakdown within arc tube 14. The dielectric breakdown within arc tube 14 is then developed into the arc discharge 20 by application of the electric and magnetic fields caused by the RF current introduced by means of the excitation coil 16. By disconnecting the moderately high voltage from stem 52, the discharge within stem 52 is extinguished so that only arc discharge 20 is present after starting.

In the discharge lamp 10 as illustrated in FIG. 1 and described hereinabove, as well as in other types of discharge lamps as previously mentioned, a problem that can be encountered is that the arc discharge sometimes exhibits an undesirable instability. As discussed in the introductory portion of this application, in the case of an HID lamp, this instability has been encountered in arc tubes filled with xenon or krypton at a partial pressure in excess of a hundred torr and dosed with metal halides, and is often encountered when the arc tube contains halogen in excess of metal halide stoichiometry. Such instability can also occur in other types of discharge lamps which are operated at a power level above some predetermined threshold. The arc discharge, when it becomes unstable will constrict itself, and because of its reduced dimensions, will be susceptible to wandering away from its normally stable position of being in adjacent proximity to the arc tube wall thereby risking self-extinction.

Figure 4:
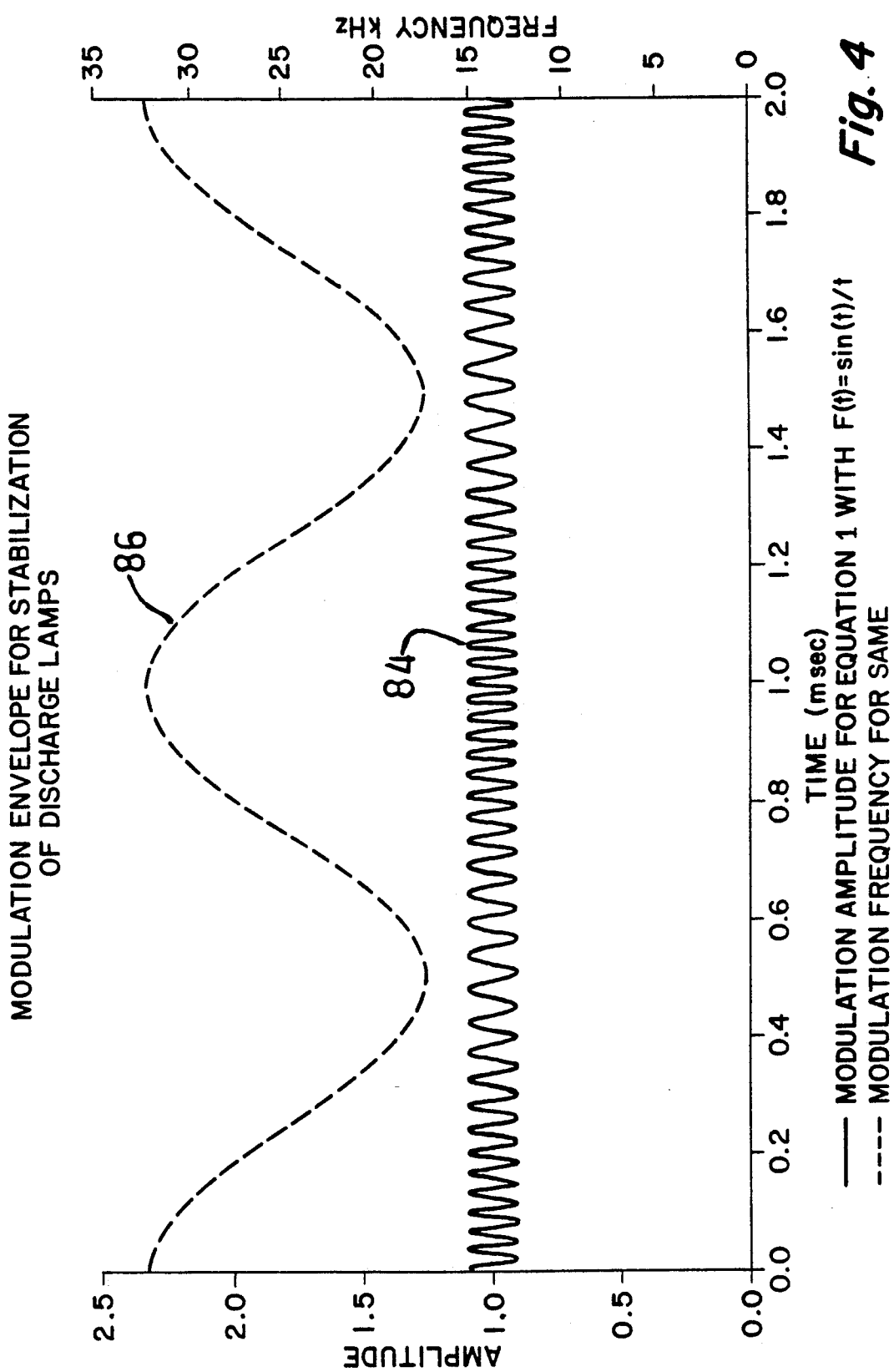
FIG. 4 is a graphical representation of the modulation scheme used in accordance with the present invention.

In an inductively-driven electrodeless HID lamp 10 as illustrated in FIG. 1, we have been able to reduce the tendency of the toroidal arc discharge 20 to become unstable under the above-described adverse conditions by modulating the RF current used to energize the excitation coil 16. In one embodiment of the invention, we amplitude modulate the RF current by imposing a time-varying waveform over top of the RF current so as to provide a modulation amplitude of greater than about 5% of the amplitude of the RF power current. As seen in FIG. 4, the modulation signal consists of an amplitude component 84 and a frequency component 86 which together form a sinusoidal modulation signal that is imposed on the RF current signal. As to the frequency component 86 of the modulating signal, we have found that by approximating the vertical-sloshing acoustic resonance frequency of the gases present in the arc tube 14 when the toroidal arc discharge 20 has reached an unstable condition and using such frequency for a modulating signal that is imposed onto the RF drive signal used to excite the arc discharge within the arc tube 14, we have achieved stabilization of such discharge by means of maintaining the positioning and dimensional characteristics of the discharge in the desired arrangement.

The technique of amplitude modulating the RF current signal by use of a modulation signal having a frequency which approximates the vertical-sloshing acoustic resonance frequency of the gases within the arc tube is achieved by use of acoustic modulation signal generator 80 which can be provided from Wavetek Corporation of San Diego, Calif., in the form of its Model 166 50 MHz Pulse/Function Generator. Though shown as a sinusoidal waveform, the modulation signal can be provided in other forms as well for instance, by a square wave, triangular wave, sawtooth wave as well as others all of which can be achieved by use of the acoustic modulation signal generator 80 previously discussed. Additionally, it is contemplated that other modulation techniques in addition to amplitude modulation would also be effective to achieve the arc stabilization of the present invention and that such other modulation techniques are comprehended as within the scope of the present invention.

Figure 2:
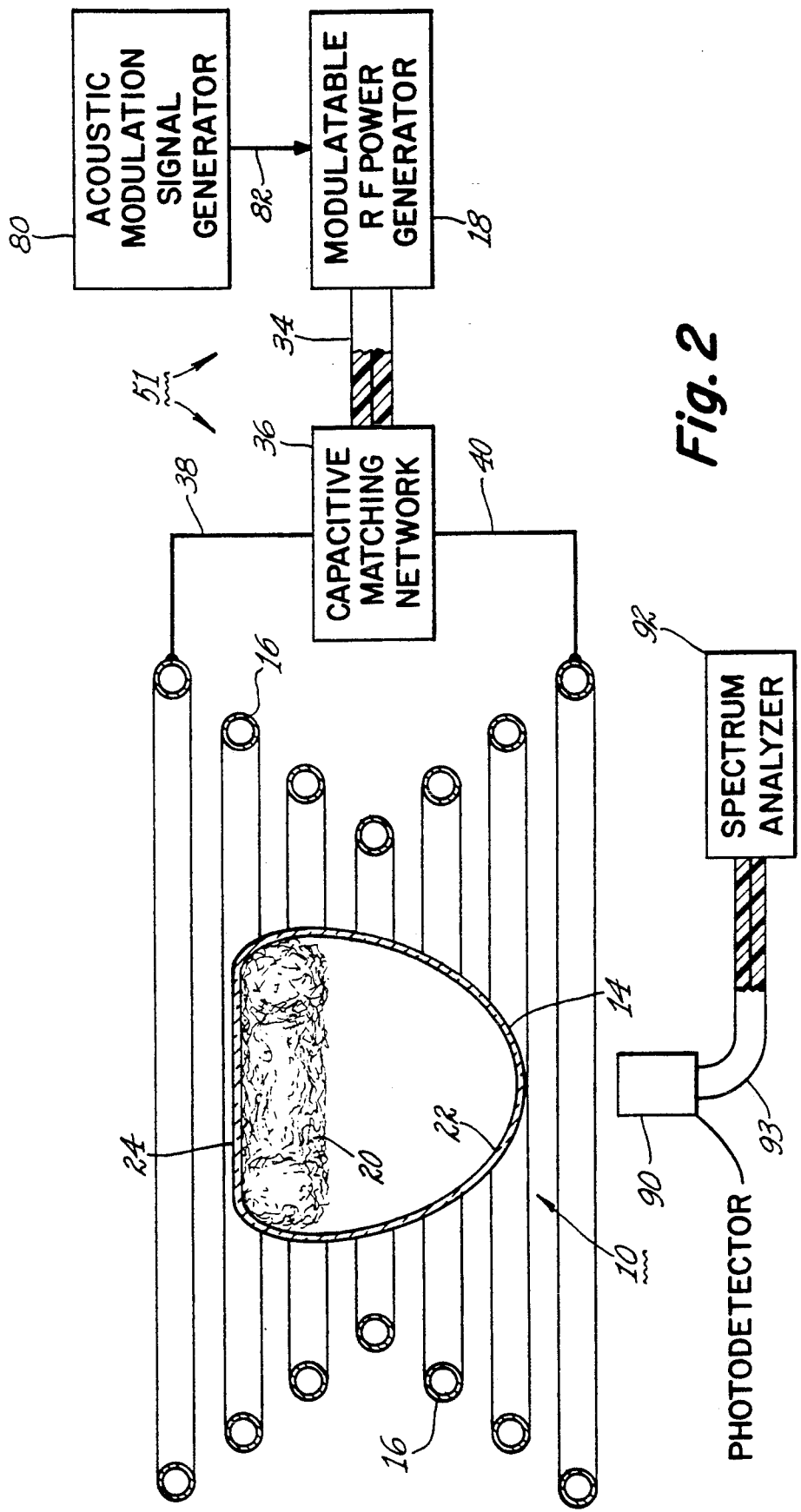
FIG. 2 is a schematic drawing of a simplified form of a lighting system similar to that shown in FIG. 1 and including instrumentation used in the performance of certain tests described hereinafter.

For establishing a baseline value of the frequency of the modulating signal and that such frequency in fact approximates the vertical sloshing acoustic resonance frequency, we have conducted tests on a simplified form of the FIG. 1 lamp and on the energizing system 51 in order to determine the acoustic resonance frequency of the gases within the arc tube 14 when a toroidal arc discharge is present and the lamp is being operated at selected levels of power. The simplified form of the lighting system is shown in FIG. 2 and except for the use of a seven turn coil made of copper tubes as the excitation coil 16, the excitation circuit 51 of FIG. 1 is the same as is shown in FIG. 2. Additionally, except for the fact that the outer jacket 50 is omitted, the lamp 10 of FIG. 1 is the same as is utilized in FIG. 2, such omission being made to simplify the test procedures and equipment and having no significant effects on the hereinafter-discussed test results as compared to those obtainable from a lighting system as shown in FIG. 1. For monitoring lamp performance, the FIG. 2 system employs instrumentation comprising a photodetector 90 positioned beneath the lamp and a spectrum analyzer 92 connected to the photodetector 90 through a coaxial cable 93 to receive the output of the photodetector. In one embodiment, the photodetector is a UDT PIN 10 AP device which is mounted in a small aluminum box providing essential shielding to reduce pickup of 13.56 MHz noise.

With the arc tube of FIG. 2 operating at a power level of below 300 watts, we found by visually examining the toroidal discharge through a dark glass filter that the discharge was stable, resting against the wall 24 and substantially filling the arc tube 14 in a radial direction, as shown in FIG. 2. Of course, for certain types of discharge lamps, because of the inability of all arc tube materials to withstand the heat of the arc discharge directly in contact with the arc tube wall, the arc discharge will not reside against the wall but in close proximity thereto. In such a situation, the arc stabilization arrangement of the present invention can be modified so as to allow for the displacement of the arc discharge along two of its surfaces, for instance, along the top surface as well as the bottom surface thereby effectively suspending the arc discharge thereby. In the embodiment as illustrated in FIG. 1 the arc tube is constructed of a material that will withstand the contact of the arc discharge against the arc tube wall thereby allowing that the arc stabilization arrangement act only against one surface of the toroidal discharge arc 20; that is, by exerting a force against the bottom portion of the toroidal arc discharge 20, the arc stabilization arrangement of the present invention is effective for constraining the arc discharge against the flattened top surface 24 of the arc tube 14.

Further in relation to the tests conducted using the lighting system of FIG. 2, when the power level was raised to 300 watts, the arc discharge exhibited unstable characteristics, wandering about the interior of the arc tube somewhat like a small luminous ball bouncing around in a container. When we applied to the input channel of the RF power generator 18, a time varying d.c.-biased voltage signal having its time varying component ranging in frequency from 0 to 50 kHz and having a time varying amplitude in the range of about 5 to 15% of the d.c. bias amplitude, we found that the toroidal discharge again rested stably against the arc tube wall when the frequency of the modulating signal was adjusted to about 25 kHz. Based on other studies, we concluded that the frequency of the modulating signal that produced such arc-stabilization was the vertical-sloshing acoustic resonance frequency of the discharge gases then present in the arc tube 14.

If the frequency of the acoustic modulating signal was held fixed at the above-described value that produced arc stability, it was observed that such stable condition of the toroidal discharge was maintained only brief since the acoustic resonance frequency tended to change due to changes in the gas temperature and the resultant changes in the velocity of the pressure waves within the arc tube 14. We have been able to overcome this latter problem (i.e. the problem of maintaining arc stability despite changes in the acoustic resonance frequency) by varying the frequency of the acoustic modulating signal so that its instantaneous frequency passes through a range of several kHz that encompasses the range of frequencies over which the acoustic resonance frequency is varying. While such frequency sweeping technique causes the acoustic modulation frequency to only intermittently coincide with the then-prevailing acoustic resonance frequency, we have found that if these coincidences are repeated with sufficient frequency, the toroidal discharge can still be maintained in a stable condition, even at considerably higher power levels than the above-described threshold level (i.e. 300 watts for lamp 10 of FIG. 1). Using this frequency sweeping technique for the acoustic modulation signal imposed on the drive signal of the electrodeless HID lamp 10 of FIG. 1, a lamp which as previously discussed would typically operate stably below 300 watts, we were able to increase the threshold power level to 400 watts and maintain stability. This is an increase of ⅓ over the previous power level and it is expected that similar power level increases in other discharge lamps could be achieved without risk that the discharge would become unstable.

Figure 3:
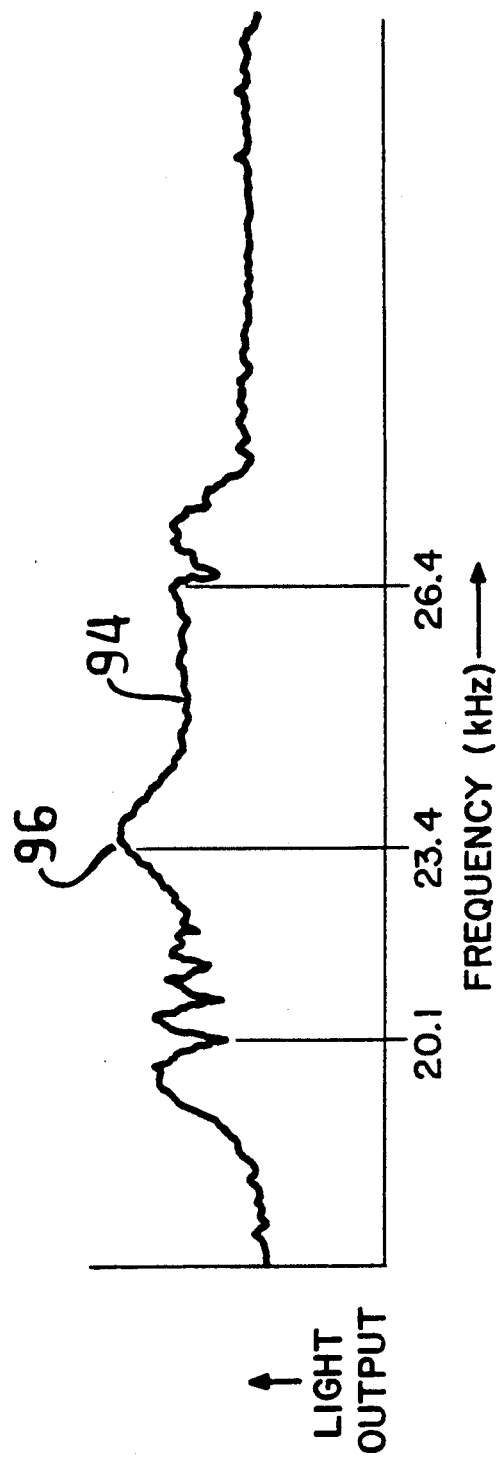
FIG. 3 is an illustration of a typical light modulation spectrum display provided by the instrumentation of FIG. 2.

Using the monitoring instrumentation described hereinabove and illustrated in FIG. 2, we have been able to establish the precise frequency at which vertical-sloshing acoustic resonance occurs. We do this by examining the light modulation display of the spectrum analyzer 92, a typical such spectrum being shown in FIG. 3. Referring to FIG. 3, a broad plateau 94 on the display indicated light modulation over the frequency range of the sweep in the frequency of the modulation signal described hereinabove. A peak 96 rising above this plateau 94 indicated extra modulation at the frequency of the acoustic resonance.

By use of the instrumentation of FIG. 2, our tests with lamp 10 and energizing system 51 constructed as shown in FIG. 2 showed that the gases in arc tube 14 had an acoustic resonance in the range of 25 kHz plus or minus a few kHz while a toroidal discharge was present in the arc tube 14 and the power input was between 300 and 400 watts. Of course, for other discharge lamps having different fills and different power levels of operation, it is possible that the acoustic resonance frequency can be different and can vary over a different range than was discovered for the present example. It is comprehended that such other acoustic resonance frequencies can be easily determined and used as a basis for a modulating signal that would be imposed on the drive signal of the other discharge lamp thus performing the invention as set forth herein. In the above experiment, we were able to maintain the toroidal discharge in a stable state over the stated power range by sweeping the frequency of the acoustic modulation signal over a range of about 5 kHz thus encompassing the range of acoustic resonant frequencies, and performing such sweeping operation about 100 times per second.

A suitable waveform (of current I plotted against time t) for RF current that is amplitude modulated by an acoustic modulation signal that is swept over a predetermined frequency range in the above-described manner can be expressed by the following equation:

$$I(t) = A_{rf} \sin(2\pi f_{rf}t)\{1 + A_{am} \sin[2\pi f_{am}t + A_{fm}F(2\pi F_{fm}t)]\}$$

Where:

$f_{rf}$ is the frequency of said RF current.

$f_{am}$ is the frequency of said RF current amplitude modulation, typically set near the then-prevailing vertical-sloshing acoustic-resonance frequency of the gases in said arc tube when said toroidal arc discharge is present.

$f_{fm}$ is the frequency with which the phase of said RF amplitude modulation is varied.

$A_{rf}$ is the RF current amplitude (without amplitude modulation).

$A_{am}$ is the relative amplitude of said RF current modulation to $A_{rf}$.

$A_{fm}$ is the amplitude of said phase modulation.

$F(\phi)$ is any suitable periodic function. In the above equation, $\phi$ is equal to $2\pi f_{fm}t$.

Typical values for these parameters are:

$f_{rf}$ 13.56 MHz
$f_{am}$ 25 kHz
$f_{fm}$ 100 Hz
$A_{rf}$ 3.5 amps into 50 ohms at 300 watts
$A_{am}$ 0.1
$A_{fm}$ (0.1) $2\pi$
$F(\phi)$ $-1 \leq F(\phi) \leq 1$ sawtooth Our tests with the lighting system of FIG. 2 demonstrated a number of important capabilities of the system. One of these was that the arc stabilizing arrangement (18, 80, 82) was capable of operating effectively irrespective of the orientation of the arc tube 14; that is, the toroidal discharge continued to operate in a stable manner at the increased power level and at non-upright orientations as well as upright ones. By amplitude-modulating the RF current signal in the above-described manner, we were able to stabilize the toroidal arc discharge 20 against the arc tube wall 24 whether the arc tube was inverted or had its central axis tilted in any direction.

Another capability demonstrated by out tests relating to the lighting system of FIG. 2 was that the arc-stabilizing arrangement was capable of holding the toroidal arc discharge in its stable position against the arc tube wall 24 despite substantial changes in the location of the excitation coil 16. In our tests, the coil 16 was shifted both radially and axially relative to the arc tube 14 and throughout these excursions of the coil 16, the toroidal arc discharge 20 remained near the flattened end surface 24 of the arc tube 14. This capability is advantageous in that it makes our system less sensitive to relative alignment of its components, as might be caused by manufacturing tolerances, mechanical shocks, or other displacing forces.

Still another capability of the lighting system of FIG. 2 is that operation of the arc-stabilization arrangement had little or no adverse impact on the luminous efficacy of the arc tube over a broad power range. In certain of our tests, we measured the relative light output from the arc tube with the photodetector 90 of FIG. 2 while keeping the geometric arrangement for light sampling fixed while the input power and the stabilization were raised over a broad range. The results indicated that acoustic stabilization had little or no impact on luminous efficacy over a broad power range.

While we have shown and described a particular embodiment of the invention, it will be obvious to those skilled in the art that various changes and modifications may be made without departing from the invention in its broader aspects and we therefore intend to cover all such changes and modifications as fall within the scope of our invention. For instance, as previously mentioned, the arc stabilization arrangement of the present invention whereby a frequency associated with the acoustic resonance of the gasses within the discharge arc tube is used to modulate the drive signal for the arc discharge and that such arrangement would be equally effective for various types of discharge lamps regardless of the type of discharge (i.e. HID, microwave), the shape of the arc tube, or the type of excitation.

We claim:

1. An arc stabilization arrangement for an arc discharge lamp having an arc tube containing a fill of materials excitable to a discharge state upon introduction thereto of an operating signal having a predetermined frequency associated therewith, said arc stabilization arrangement comprising:
   means for modulating said operating signal with a modulating signal having a frequency less than said predetermined frequency associated with said operating signal;
   wherein an acoustic resonance is generated within said arc tube be such excitation of said materials to the discharge state, said acoustic resonance having an acoustic resonance frequency associated therewith; and
   wherein said frequency of said modulating signal is set to approximately the same frequency value as said acoustic resonance frequency.

2. An arc stabilization arrangement as set forth in claim 1 wherein said operating signal is an RF current signal and said modulating means is effective for amplitude modulating said RF current signal to provide a modulating amplitude of greater than about 5 percent of the amplitude of the RF current signal.

3. An arc stabilization arrangement as set forth in claim 1 wherein said acoustic resonance frequency associated with the excitation of said materials can change in response to changing operating conditions of said discharge lamp and wherein said modulating means is further effective for periodically sweeping said frequency of said modulation signal across a range of frequencies which encompasses such changes in said acoustic resonance frequency.

4. An arc stabilization arrangement as set forth in claim 1 wherein said discharge lamp is an electrodeless discharge lamp and said operating signal is coupled to said discharge arc by one of an inductive or a capacitive coupling device.

5. An arc stabilization arrangement as set forth in claim 4 wherein said operating signal is an RF current signal coupled to said discharge arc by an inductive coupling device and further wherein said predetermined frequency of said RF current signal is between 3 and 300 MHz whereas said frequency of said modulating signal is below 3 MHz.

6. An electrodeless discharge lamp and energizing system therefor comprising:
   a light transmissive arc tube containing a gaseous fill;
   an excitation device disposed about said arc tube and energizable with an RF signal at a predetermined frequency, said RF signal being effective so as to develop an arc discharge in said gaseous fill upon a dielectric breakdown of said gaseous fill;
   means for energizing said excitation device with said RF signal; and
   means for modulating said RF signal with a modulating signal having a frequency associated therewith which is different than said predetermined frequency of said RF signal, said modulating signal frequency being approximately equal to an acoustic resonance frequency associated with the excitation of said gaseous fill.

7. The lamp and energizing system as set forth in claim 6 wherein said RF signal is an RF current signal and said modulating means is effective for amplitude modulating said RF current signal to provide a modulating amplitude of greater than about 5% of the amplitude of said RF current signal.

8. The lamp and energizing system as set forth in claim 6 wherein said acoustic resonance frequency associated with the excitation of said materials can change in response to changing operating conditions of said discharge lamp and wherein said modulating means is further effective for periodically sweeping said frequency of said modulation signal across a range of frequencies which encompasses such changes in said acoustic resonance frequency.

9. The lamp and energizing system as set forth in claim 8 wherein said periodic sweeping of said modulating signal has associated therewith, a waveform selected from the group consisting of ramp, sawtooth, and triangular waveforms.

10. The lamp and energizing system as set forth in claim 6 wherein said arc tube is a hollow structure having two spaced-apart ends and is configured to have end-to-end asymmetry, with one end substantially flattened relative to the other end.

11. The lamp and energizing system of claim 7 wherein said means for amplitude-modulating said RF current has frequency and amplitude of such values as to hold said toroidal arc discharge in stabilized relationship with a wall of said arc tube.

12. A method of stabilizing an arc discharge of a discharge lamp having an arc tube containing a fill of material excitable to a discharge state upon introduction thereto of an operating signal having a predetermined frequency associated therewith, said arc stabilizing method comprising the steps of:
   measuring an acoustic resonance frequency associated with the excitation of the materials within said arc tube; and,
   modulating said operating signal with a modulating signal having a frequency associated therewith which approximates said acoustic resonance frequency, said acoustic resonance frequency being different than said predetermined frequency associated with said operating signal.

13. An arc stabilizing method as set forth in claim 12 further comprising the step of sweeping said modulating signal frequency about a range of frequencies which encompasses a range of frequencies over which said acoustic resonance frequency can vary in response to varying conditions of said fill within said arc tube.

* * * * *